(12) United States Patent
Yang (10) Patent No.: US 10,127,256 B2
(45) Date of Patent: Nov. 13, 2018

(54) ASSET STORAGE SYSTEM AND METHOD, AND COMPUTER READABLE RECORDING MEDIUM THEREOF

(71) Applicant: INSTITUTE FOR INFORMATION INDUSTRY, Taipei (TW)

(72) Inventor: Wei-Jen Yang, Kaohsiung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 416 days.

(21) Appl. No.: 14/953,440

(22) Filed: Nov. 30, 2015

(65) Prior Publication Data
US 2017/0139967 A1    May 18, 2017

(30) Foreign Application Priority Data
Nov. 12, 2015  (TW) .............................. 104137366 A (51) Int. Cl.
*G06F 17/30* (2006.01)

(52) U.S. Cl.
CPC .. *G06F 17/30327* (2013.01); *G06F 17/30424* (2013.01); *G06F 17/30604* (2013.01)

(58) Field of Classification Search
CPC ................... G06G 17/30327; G06G 17/30424
USPC .................................. 707/741, 805; 705/348
See application file for complete search history.

(56) References Cited

U.S. PATENT DOCUMENTS

| 2004/0181418 A1* | 9/2004 | Petersen .............. G06Q 10/067 717/107 |
| 2008/0005107 A1* | 1/2008 | Funaki .............. G06F 17/30722 707/6 |
| 2008/0183514 A1* | 7/2008 | Moulckers ................ G06F 8/36 705/304 |

FOREIGN PATENT DOCUMENTS

| CN | 1519741 A | 8/2004 |
| TW | 201415252 A | 4/2014 |

OTHER PUBLICATIONS

The office action of the corresponding Taiwan application dated Jun. 27, 2016.

* cited by examiner

*Primary Examiner* — Chelcie Daye
(74) *Attorney, Agent, or Firm* — CKC & Partners Co., Ltd.

(57) ABSTRACT

An asset storage method includes storing an asset database including a plurality of initial business logical entities and a plurality of initial implementation entities; receiving a to-be-searched business logical entity; and searching the initial implementation entities corresponded to the to-be-searched business logical entity. Each initial business logical entity and at least one of the initial implementation entities are related to each other.

13 Claims, 6 Drawing Sheets

ASSET STORAGE SYSTEM AND METHOD, AND COMPUTER READABLE RECORDING MEDIUM THEREOF

RELATED APPLICATIONS

This application claims priority to Taiwan Application Serial Number 104137366, filed Nov. 12, 2015, the entirety of which is herein incorporated by reference.

BACKGROUND

Field of Invention

The present invention relates to an asset storage technology. More particularly, the present invention relates to an asset storage system and method, and a computer readable recording medium thereof.

Description of Related Art

In conventional asset storage modes, assets are mostly respectively developed and exist in the form of information entities, and the content of the assets is identified by utilizing markers, keywords and the like. For example, through a search page, a user fills a to-be-searched keyword in a user interface, so that a search engine performs searching according to the keyword input by the user, and presents the searching result on the search page.

However, after the related information entities are found by utilizing markers or keywords and the like, possibly due to the excessive amount of information entities conforming to the searching conditions, the user still has to examine program codes or information content to know whether the information content meets requirements of specific functions. In addition, the utilization of markers or keywords may cause inaccuracy in searching results possibly due to variance of marking methods used by respective users.

Therefore, an improved recommendation system should be provided.

SUMMARY

To solve the above-mentioned problem, an aspect of the present invention provides an asset storage system. The asset storage system includes a storage device, a user interface module and an operation module. The storage device is used for storing an asset database that includes multiple initial business logical entities and multiple initial implementation entities, wherein each initial business logical entity and at least one of the initial implementation entities are related to each other. The user interface module is used for receiving a to-be-searched business logical entity. The operation module is used for searching in the storage device the initial implementation entities corresponding to the to-be-searched business logical entity.

Another aspect of the present invention provides an asset storage method. The asset storage method includes storing an asset database that includes multiple initial business logical entities and multiple initial implementation entities; receiving a to-be-searched business logical entity; and searching the initial implementation entities corresponded to the to-be-searched business logical entity, wherein each initial business logical entity and at least one of the initial implementation entities are related to each other.

A further aspect of the present invention provides a non-volatile computer readable recording medium. The non-volatile computer readable recording medium stores a computer program and is used for executing an asset storage method applied to an asset storage system, wherein the asset storage method includes storing an asset database which includes multiple initial business logical entities and multiple initial implementation entities; receiving a to-be-searched business logical entity; searching the initial implementation entities corresponded to the to-be-searched business logical entity; establishing the relevance between the initial business logical entities and the initial implementation entities and automatically establishing a database relevance tree according to the relevance; receiving a withdrawing business logical signal or a selecting business logical signal; and after receiving the withdrawing business logical signal or the selecting business logical signal, automatically updating the database relevance tree according to the withdrawing business logical signal or the selecting business logical signal. Each initial business logical entity and at least one of the initial implementation entities are related to each other. The database relevance tree includes at least one child node and at least one parent node, and each node of the database relevance tree records one of the initial business logical entities and the corresponding initial implementation entities thereof.

In view of the above, compared with the prior art, the technical solution of the present invention has obvious advantages and beneficial effects. With the aforementioned technical solution, a considerable technical progress can be achieved with the value of being widely applied to the industry. According to the disclosure, the relevance between each business logical entity and each implementation entity is stored while asset data is stored, so that the relationship between elements can be found easily during searching of the elements. When business logical entities are selected or withdrawn by means of the relevance, it can be effectively determined whether there are corresponding implementation entities that are available or need to be withdrawn together, and thus the asset data can be stored and used more efficiently.

BRIEF DESCRIPTION OF THE DRAWINGS

In order to make the foregoing as well as other aspects, features, advantages and embodiments of the present invention more apparent, the accompanying drawings are described as follows.

DETAILED DESCRIPTION

The spirit of the disclosure is described in detail below with reference to the drawings. After learning about the preferred embodiments of the disclosure, those of ordinary skills in the art can perform alternation and modification according to the technology taught by the disclosure, without departing from the spirit and scope of the disclosure.

An implementation aspect of the present invention provides an asset storage system. For clarity of illustration, in the following paragraphs, the asset storage system is described by taking the storage of asset data as an example. However, in practice, the asset storage system can also be used for storing various substantial or abstract entities, such as locations, webpages and information items, and thus the application of the asset storage system is not limited to the following embodiments.

Figure 1:
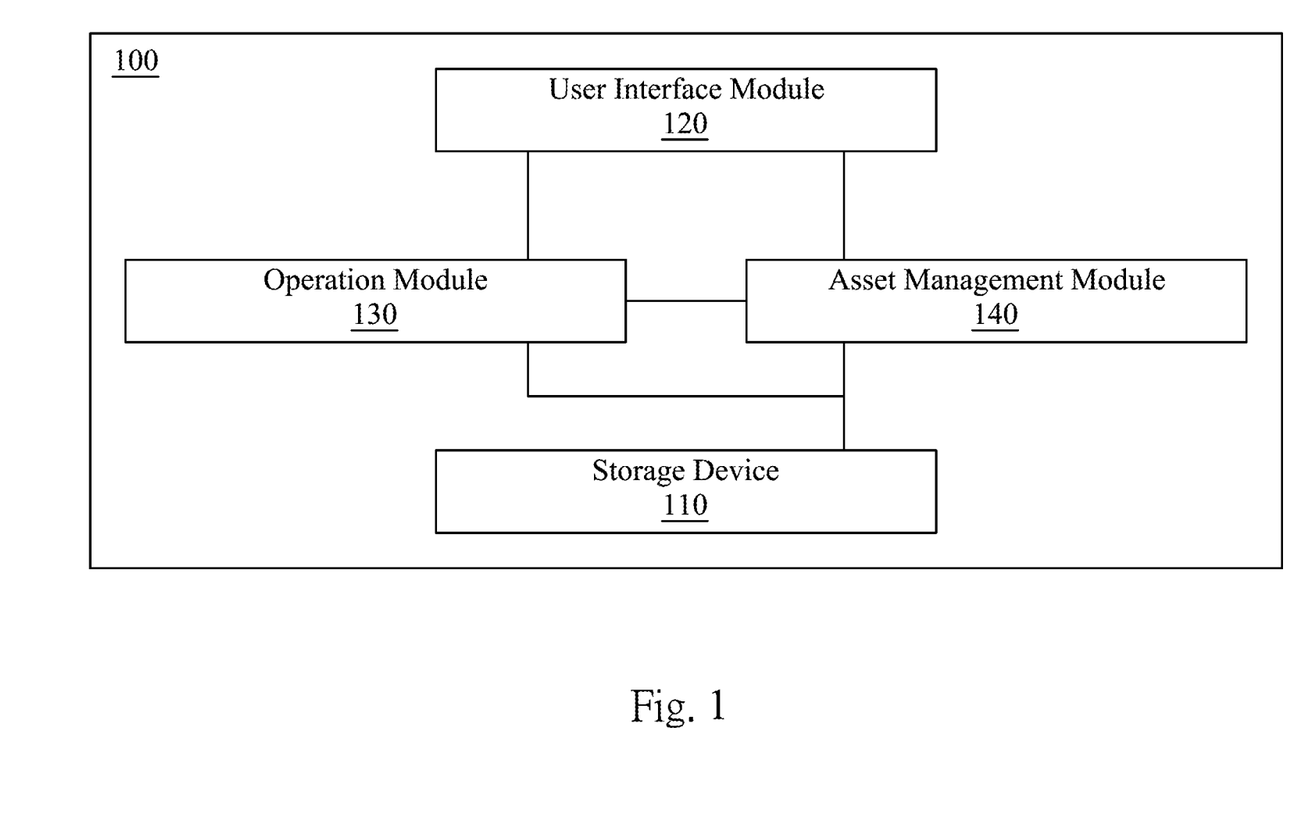
FIG. 1 illustrates a block diagram of an asset storage system according to an embodiment of the present invention.

Referring to FIG. 1, FIG. 1 illustrates a block diagram of an asset storage system 100 according to an embodiment of the present invention. The asset storage system 100 includes a storage device 110, a user interface module 120 and an operation module 130. In one embodiment, the asset storage system 100 may further include an asset management module 140. In one embodiment, the user interface module 120 is electrically coupled to the operation module 130 and the asset management module 140; the operation module 130 is electrically coupled to the asset management module 140; and the storage device 110 is electrically coupled to the operation module 130 and the asset management module 140. It should be noted that the connection relations between the modules in the asset storage system 100 are not limited by the aforementioned embodiments, and all connection modes that enable the asset storage system 100 to achieve the following technical content can be applied to the present invention.

In this embodiment, the asset storage system 100 is embodied through for example, but not limited to, a computer system. The user interface module 120 is used for generating a user operation interface for example used for providing a webpage, a window or other interfaces that present data visually. The storage device 110 can be embodied in for example, but not limited to, a read-only memory, a flash memory, a floppy disk, a hard disk, an optical disk, a flash drive, a tape, a database accessible from the network or a computer readable recording medium which can be easily thought of by those skilled in the art and have the same function. The user interface module 120, the operation module 130 and the asset management module 140 are embodied in for example, but not limited to, a central processing unit, a microprocessor or other appropriate processing elements.

Figure 2:
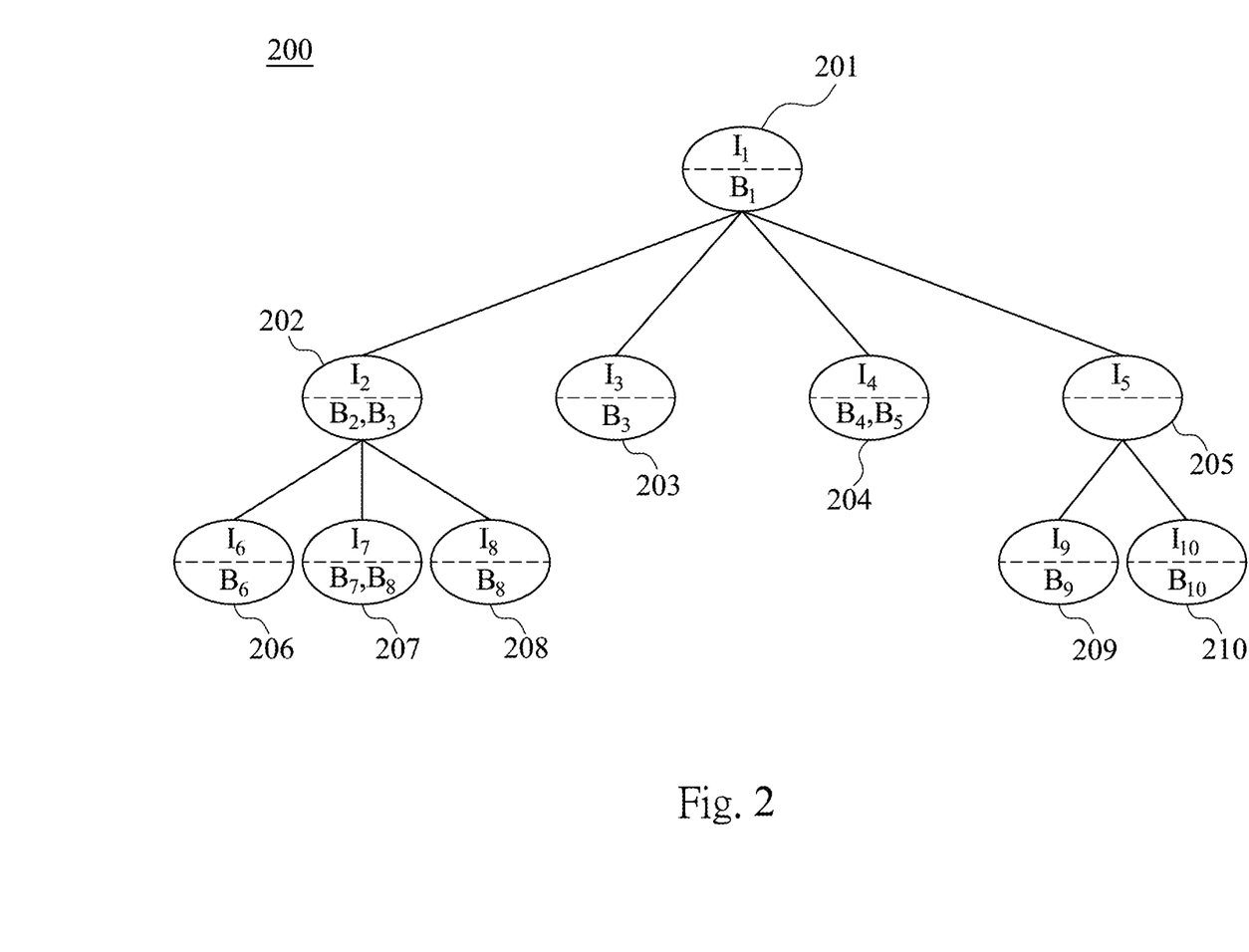
FIG. 2 illustrates a database relevance tree established in terms of initial business logical entities and initial implementation entities according to an embodiment of the present invention.

The asset storage system 100 and the corresponding asset storage method thereof are further described below. Referring to FIGS. 1 and 2 together, FIG. 2 illustrates a database relevance tree 200 established in terms of initial business logical entities B1-B10 and initial implementation entities I1-I10 according to an embodiment of the present invention.

In one embodiment, the storage device 110 is used for storing an asset database which includes multiple asset entities, and the asset entities refer to technical processes, technical functions, technical elements, services, user interfaces, career goals, execution policies, business models, business processes, policy goals and career capabilities and the like that are developed or defined by utilizing information technology (IT) and can all be regarded as asset elements. Further for example, a search function, a search method, a product display function, a list display method and a login function and the like in a website each can be regarded as an asset entity. In one embodiment, the asset entities can be developed by system developers. And, it is also feasible to search and add external existing public asset entities. The system developers can define the relative relations between asset entities according to specific functions or implementation modes of the asset entities, and divide the asset entities into business logical entities or implementation entities. For example, in respect of a relative relation between two asset entities, the system developers can define one abstract asset entity as a business logical entity, and define the other concrete asset entity as an implementation entity. In one embodiment, asset entities in a webpage system can include a search function and a search method, wherein the search function can be implemented by adopting the search method, so that as far as the relative relations between the two entities (the search function and the search method), the search function belongs to abstract asset entities while the search method belongs to concrete asset entities, and thus the system developers define the search function as a business logical entity while defining the search method as an implementation entity. In one embodiment (for example as shown in FIG. 2), the asset entities can be multiple initial business logical entities B1-B10 and multiple initial implementation entities I1-I10. Wherein, each of the initial business logical entities B1-B10 has relevance to at least one of the initial implementation entities I1-I10. The user interface module 120 is used for receiving a to-be-searched business logical entity. The operation module 130 is used for searching in the storage device 110 the initial implementation entities corresponding to the to-be-searched business logical entity.

For example, after a user inputs a to-be-searched business logical entity B6 through the user interface module 120, the operation module 130 searches in the storage device 110 an initial implementation entity I6 corresponding to the to-be-searched business logical entity B6.

By this, the asset storage system 100 can be used for storing the relevance between each of the initial business logical entities B1-B10 and each of the initial implementation entities I1-I10, and thus the relevance between elements can be found easily when the elements are searched.

In one embodiment, the asset management module 140 is used for establishing the relevance between the initial business logical entities B1-B10 and the initial implementation entities I1-I10, and automatically establishing a database relevance tree 200 (as shown in FIG. 2) according to the relevance. Wherein, the database relevance tree 200 includes at least one child node and at least one parent node. For example, as can be seen from FIG. 2, child nodes 206-208 are provided with a parent node 202, and child nodes 209-210 are provided with a parent node 205. In addition, each node of the database relevance tree 200 records one of the initial business logical entities B1-B10 and the corresponding initial implementation entity thereof. For example, a node of the initial business logical entity B9 also records the corresponding initial implementation entity I9 thereof.

By this, users can define the relevance between the initial business logical entities B1-B10 and the initial implementation entities I1-I10 when designing the asset database, and by automatically establishing the database relevance tree 200, users can learn more clearly about the relevance between the initial business logical entities B1-B10 and the initial implementation entities I1-I10.

In one embodiment, the asset database is a multilayer database that at least includes an upper layer database structure and a lower layer database structure. In one embodiment, the upper layer database structure includes the initial business logical entities B1-B10, and the lower layer database structure includes the initial implementation entities I1-I10. Wherein, the initial business logical entities B1-B10 in the upper layer database structure are used for defining functions of the asset entities. For example, the multiple asset entities (and nodes 201-210) shown in FIG. 2 can be asset entities related with a shopping website, and in this embodiment, the initial business logical entity B6 can be defined as a product display function. On the other hand, the initial implementation entities I1-I10 in the lower layer database structure are used for defining a method of implementing a corresponding function. For example, in FIG. 2, the initial implementation entity I6 can be defined as a list, and in this embodiment, the list is an implementation method of implementing the product display function. Thus it can be known that functions (for example, the upper layer database structure is used for defining the product display function) capable of being implemented by the asset entities and methods (for example, the lower layer database structure is used for defining a list so as to implement product display) of correspondingly implementing the functions can be defined through the upper layer database structure and the lower layer database structure.

Thus it can be known that the asset storage system 100 can store the relevance between the asset entities as well while storing the asset entities, and the asset storage system 100 makes it feasible to find the relations between an upper layer and a lower layer of each element (as shown in FIG. 2).

In one embodiment, the asset database is a multilayer database. By means of the multilayer database, the asset entities can be divided into multiple layers (such as being divided into four layers) in terms of specific degrees, and the asset entities of a higher layer are closer to the human intuition. For example, the first layer is a warning function of some system wanted by a user. In contrast, the asset entities of a lower layer are closer to methods of implementing functions. For example, the fourth layer is a specific implementation method for a system to urge some hardware to send out signals.

For example, the multilayer database can divide the asset entities into a policy layer, an operation layer, an execution layer and an implementation layer, wherein the policy layer is the uppermost layer (such as the first layer), and the implementation layer is the lowermost layer (such as the fourth layer). Wherein, the policy layer is used for defining career goals, execution policies and business models. The operation layer is used for defining how to achieve the made policy goals and career capabilities through a business process. The execution layer is used for defining how to meet the requirements of the operation layer through technical processes, functions, services and user interfaces and the like. The implementation layer is used for implementing and arranging all technical elements and functions defined by the execution layer. As far as any asset entity of each layer, the related upper layer asset entity is an initial business logical entity of the asset entity, and the related lower layer asset entity is an initial implementation entity of the asset entity. Thus the related upper layer or lower layer asset entities can be found for all the asset entities in each layer.

Therefore, when establishing an asset storage library, developers can determine a database layer for placing each asset entity, and store asset elements in the asset storage library. Based on the idea of layered storage of the asset entities, when asset elements are searched, even if a user inputs an easily understood abstract upper layer asset entity, the operation module 130 can still search all concrete lower layer asset entities related with the upper layer asset entity by means of the aforementioned method.

On the other hand, in one embodiment, on the conditions of implementing a function in various modes, one initial business logical entity (such as a product display function) can be defined to correspond to multiple initial implementation entities (such as a list display implementation method and a graph display implementation method). For example, when users input a wanted product display function by using the user interface module 120, the operation module 130 searches the list display implementation method and the graph display implementation method from the asset database and displays the search result through a user interface, and thus users can know that the implementation methods can be used for achieving the product display function.

In another embodiment, on the conditions of implementing various functions in the same mode, multiple initial business logical entities (such as a display function, a product adding function and a product deletion function) can be defined to correspond to one initial implementation entity (such as a product selling method that is a package process and is an implementing method including various product selling steps). For example, when users input the wanted product display function, product adding function or product deletion function through the user interface module 120, the operation module 130 searches the package process of the product selling method from the asset database and displays the search result through the user interface, and thus users can learn that the display function, the product adding function and the product deletion function can be implemented through the package process of the product selling method.

In another embodiment, in combination with the above-mentioned two embodiments, on the conditions of dividing the asset database into multiple layers, an initial business logical entity (such as a product display function, belonging to asset entities of the first layer of the asset database) needs to be implemented through an initial implementation entity (such as a list, belonging to asset entities of the second layer of the asset database), and the initial business logical entity needs to be implemented through multiple implementation sub-entities (such as column number, color and column width, belonging to asset entities of the third layer of the asset database). By dividing the asset database into multiple layers, the relevance between the asset entities can be distinguished further in detail.

Nevertheless, those of ordinary skill in the art may understand that the solution is not limited by the above-mentioned embodiments, and methods of relevance enough for definition of the asset storage system 100 can all be applied to the present invention.

Figure 3:
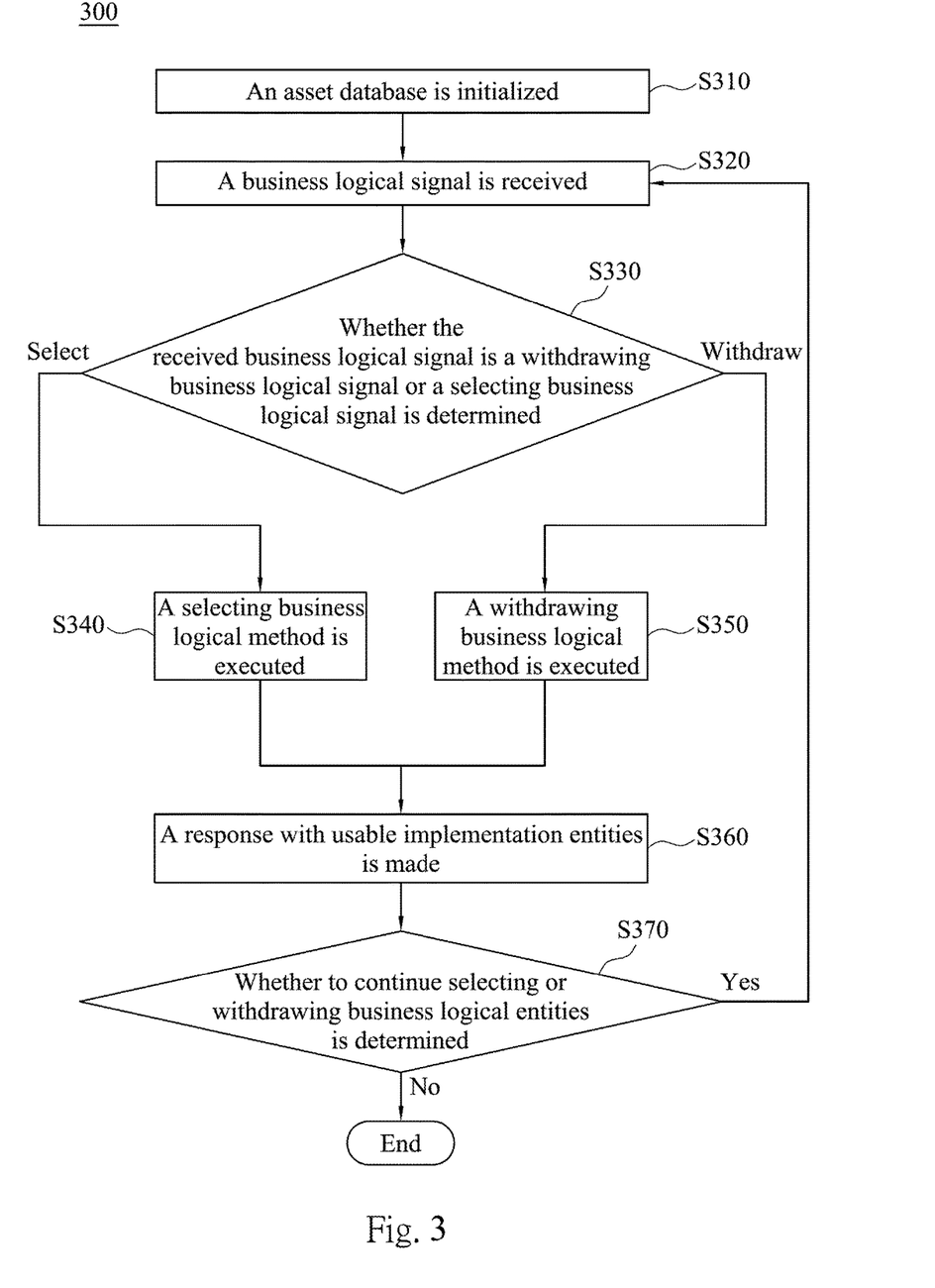
FIG. 3 illustrates a flow chart of an asset storage method according to an embodiment of the present invention.

Next, referring to FIG. 3, FIG. 3 illustrates a flow chart of an asset storage method 300 according to an embodiment of the present invention. In one embodiment, after the asset database is initialized (step S310), the user interface module 120 can be used for receiving a business logical signal (step S320), and it is determined whether the received business logical signal is a withdrawing business logical signal or a selecting business logical signal (step S330). If it is determined that the received business logical signal is the selecting business logical signal, the user interface module 120 executes a selecting business logical method (step S340); and if it is determined that the received business logical signal is the withdrawing business logical signal, the user interface module 120 executes a withdrawing business logical method (step S350). After the step S340 or the step S350 is executed, the operation module 130 responds with usable initial implementation entities (step S360), such as at least one initial implementation entity I1-I10 shown in FIG. 2, and determines whether to continue selecting or withdrawing business logical entities (step S370). If it is determined that the business logical entities continue to be selected or withdrawn, step S320 is executed again; and it is determined the business logical entities do not continue to be selected or withdrawn, the process is ended.

In one embodiment, after the user interface module 120 receives the withdrawing business logical signal or the selecting business logical signal (step S340), the asset management module 140 automatically updates the database relevance tree 200 according to the withdrawing business logical signal or the selecting business logical signal.

Figure 4A:
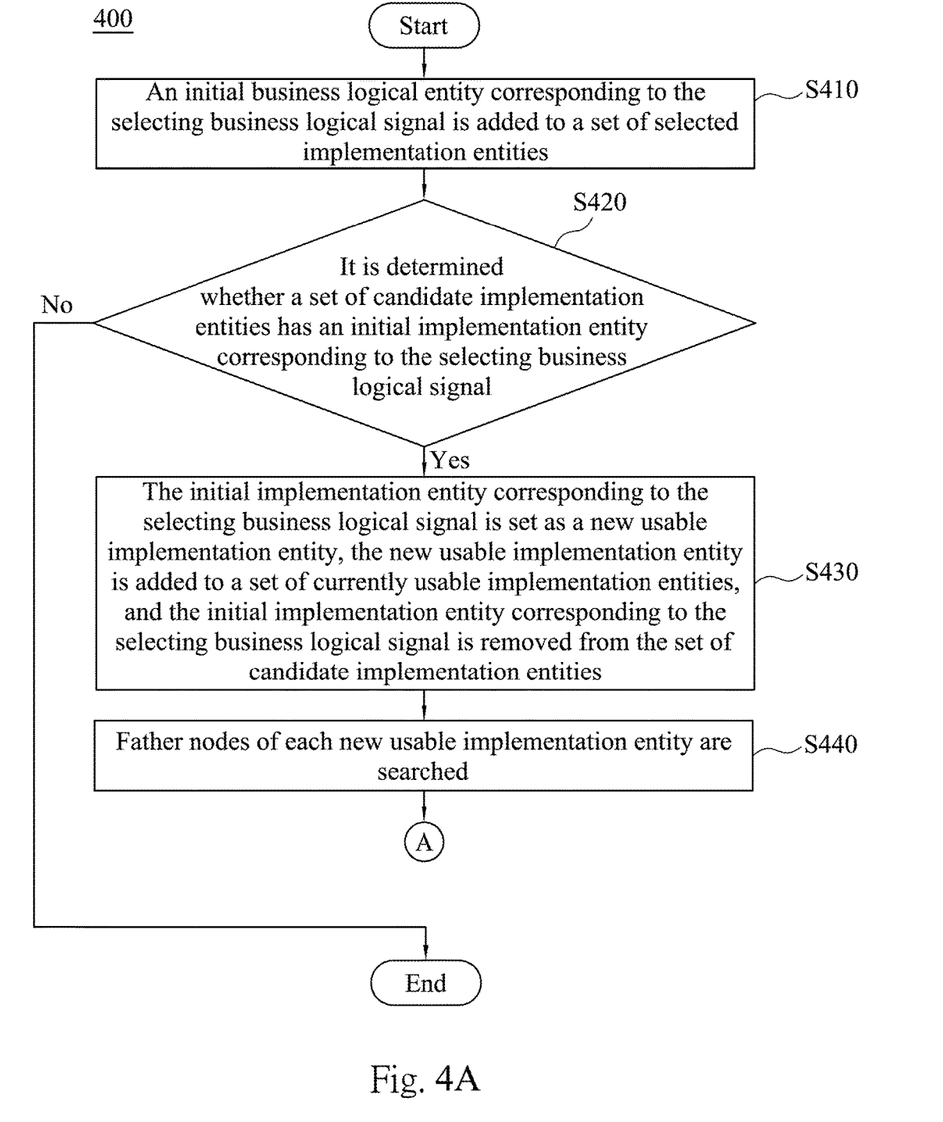
FIGS. 4A-4B illustrates flow charts of a selecting business logical method according to an embodiment of the present invention.
Figure 4B:
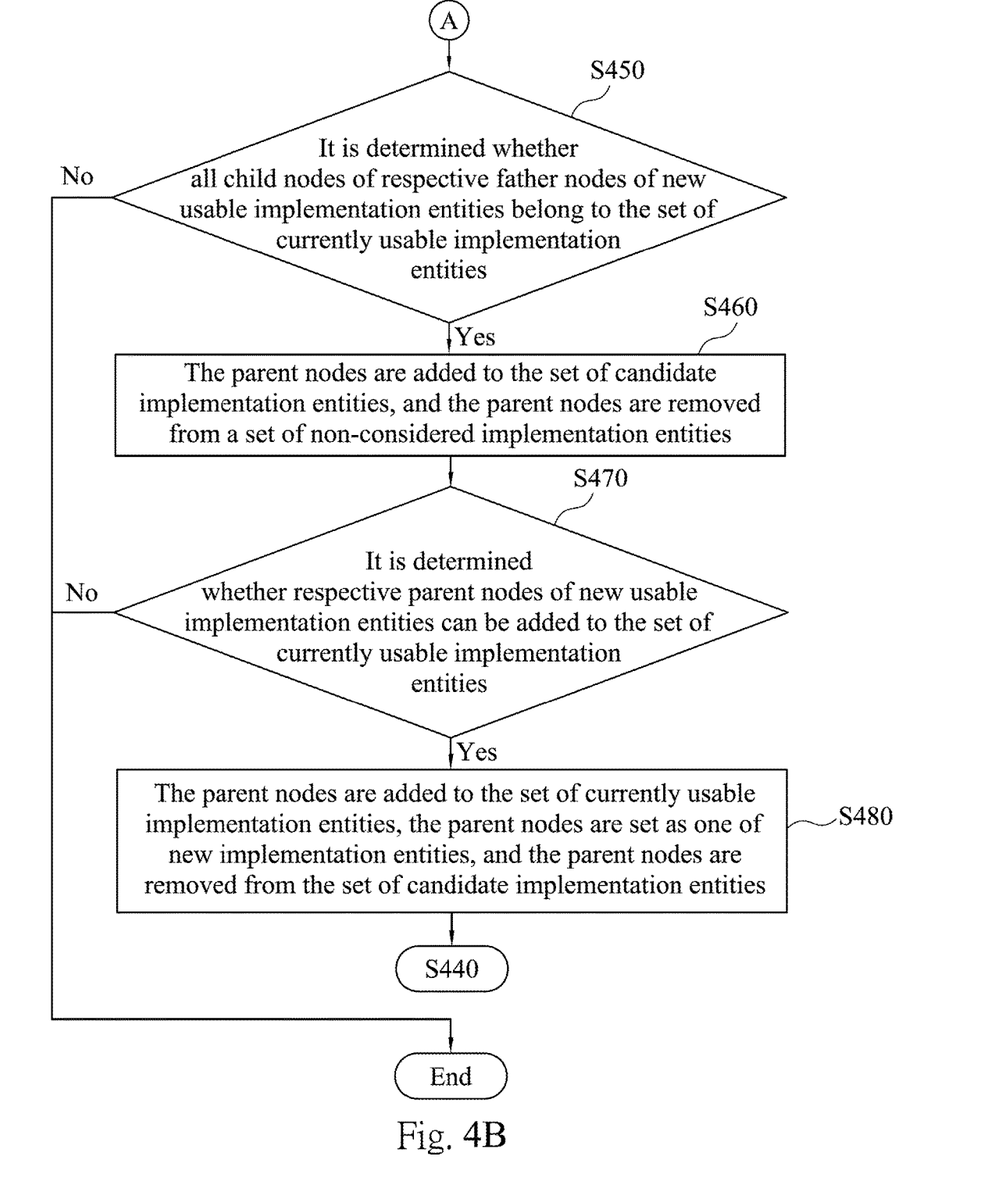

Next, the selecting business logical method and the withdrawing business logical method are further respectively described below. Referring to FIGS. 2 and 4 together, FIGS. 4A-4B illustrate flow charts of a selecting business logical method 400 according to an embodiment of the present invention.

In step S410, after the user interface module 120 receives the selecting business logical signal, the operation module 130 adds an initial business logical entity (such as an initial business logical entity B6 in FIG. 2) corresponding to the business logical signal to a set of selected implementation entities.

In step S420, the operation module 130 determines whether a set of candidate implementation entities has at least one initial implementation entity corresponding to the selecting business logical signal. If the set of candidate implementation entities has at least one initial implementation entity corresponding to the selecting business logical signal, step S430 is executed, or else the process is ended. For example, in FIG. 2, the selecting business logical signal represents the selection of the initial business logical entity B6, and the operation module 130 can determine whether a set of candidate implementation entities has at least one initial implementation entity I6 corresponding to the selecting business logical signal.

In step S430, the operation module 130 sets at least one initial implementation entity corresponding to the selecting business logical signal as at least one new usable implementation entity, adds at least one new usable implementation entity to a set of currently usable implementation entities, and removes from a set of candidate implementation entities at least one initial implementation entity corresponding to the selecting business logical signal. For example, in FIG. 2, the initial implementation entity I6 is set as a new usable implementation entity, the new usable implementation entity is added to a set of currently usable implementation entities, and the initial implementation entity I6 is removed from a set of candidate implementation entities.

In step S440, the operation module 130 searches parent nodes of each new usable implementation entity. For example, in FIG. 2, if nodes 206-208 and 210 have new usable implementation entities, in this step the operation module 130 searches a parent node 202 of the nodes 206-208 and a parent node 205 of the node 210.

In step S450, the operation module 130 determines whether all child nodes of respective parent nodes of new usable implementation entities belong to a set of currently usable implementation entities. If all the child nodes of the respective parent nodes of the new usable implementation entities belong to the set of currently usable implementation entities, step S460 is executed, or else the process is ended. For example, in FIG. 2, if the nodes 206-208 and 210 have new usable implementation entities, in this step the operation module 130 determines all child nodes 206-208 of a parent node 202 belong to a set of currently usable implementation entities, and step S460 is executed. In contrast, since only a child node 210 of a parent node 205 has new usable implementation entities while a child node 209 of the parent node 205 does not have new usable implementation entities, it can be determined that not both child nodes 210 and 209 of the parent node 205 has new usable implementation entities, and the process is ended.

In step S460, the operation module 130 adds at least one parent node to a set of candidate implementation entities, and removes at least one parent node from a set of non-considered implementation entities.

In step S470, the operation module 130 determines whether respective at least one parent node of at least one new usable implementation entity can be added to a set of currently usable implementation entities. If the operation module 130 determines that the respective at least one parent node can be added, step S480 is executed, or else the process is ended. For example, in FIG. 2, when an initial business logical entity B9 (a node 209) and an initial business logical entity B10 (a node 210) are selected, it can be determined that the parent node 202 can be added to the set of currently usable implementation entities (that is, when both child nodes 209 and 210 of the parent node 202 are selected, it can be determined that the parent node 202 can be added to the set of currently usable implementation entities), and next, step S480 is executed.

In step S480, the operation module 130 adds at least one parent node to a set of currently usable implementation entities, sets the at least one parent node as one of at least one new implementation entity, and removes the at least one parent node from a set of candidate implementation entities. In one embodiment, after step S480 is finished, step S440 is executed again.

Figure 5:
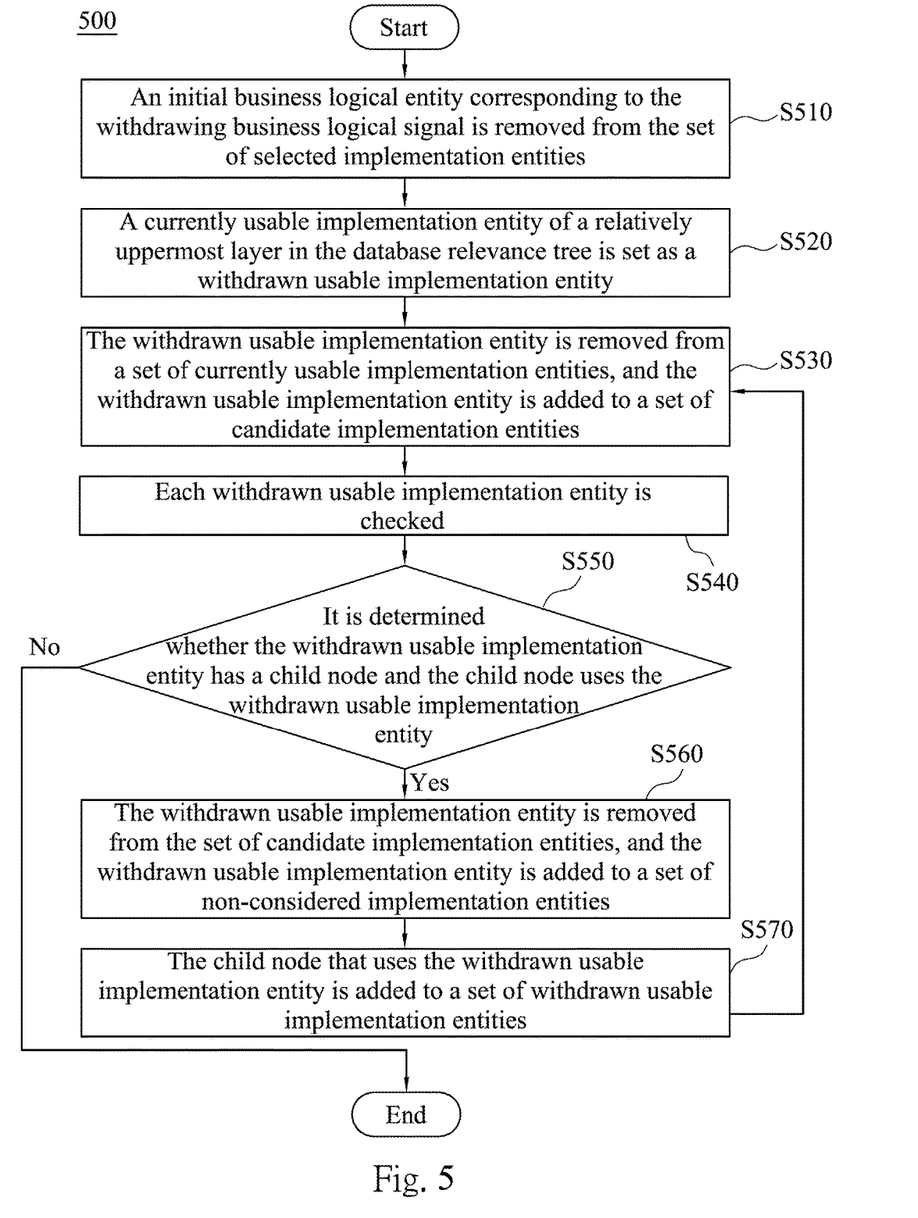
FIG. 5 illustrates a flow chart of a withdrawing business logical method according to an embodiment of the present invention.

On the other hand, a withdrawing business logical method is described below. Referring to FIGS. 2 and 5 together, FIG. 5 illustrates a flow chart of a withdrawing business logical method 500 according to an embodiment of the present invention.

In step S510, after the user interface module 120 receives the withdrawing business logical signal, the operation module searches an initial business logical entity corresponding to the withdrawing business logical signal, and removes the initial business logical entity corresponding to the withdrawing business logical signal from a set of selected implementation entities. For example, in FIG. 2, if users want to withdraw an initial business logical entity B8, the initial business logical entity B8 is removed from the set of selected implementation entities.

In step S20, the operation module 130 searches at least one currently usable implementation entity of initial business logical entities that use the withdrawing business logical signal, and according to the database relevance tree 200, the operation module 130 sets the currently usable implementation entity of the relatively uppermost layer in the database relevance tree 200 as a withdrawn usable implementation entity. For example, in FIG. 2, when users want to withdraw the initial business logical entity B8, the operation module 130 checks currently usable implementation entities sequentially downwards from the uppermost layer of the database relevance tree 200, and from the currently usable implementation entities, the operation module 130 finds at least one currently usable implementation entity of the relatively uppermost layer. In one embodiment, the operation module 130 can sequentially check a root node 201 (the highest layer in the database relevance tree 200) with maximum child nodes 202-210, check nodes 202-205 (the second highest layer in the database relevance tree 200), and sequentially check the lower layers downwards, so as to find whether there are currently usable implementation entities. In this embodiment, the operation module 130 first finds that in the currently usable implementation entities, an initial implementation entity I2 is used to initial business logical entities B2, B3, B6, B7 and B8. That is to say, the initial implementation entity I2 itself or child nodes 206-208 thereof is/are used to the initial business logical entity B8, and the initial implementation entity I2 is set as a withdrawn usable implementation entity. In addition, in one embodiment, the operation module 130 can sequentially check a root node 201 (the highest layer in the database relevance tree 200) with maximum child nodes 202-210 and then check nodes 202-205 (the second highest layer in the database relevance tree 200), and sequentially check the lower layers, so as to find whether there are currently usable implementation entities.

In step S530, the operation module 130 removes withdrawn usable implementation entities from a set of at least one currently usable implementation entity, and adds the withdrawn usable implementation entities to a set of candidate implementation entities.

In step S540, the operation module 130 checks each withdrawn usable implementation entity.

In step S550, the operation module 130 determines whether the withdrawn usable implementation entities have at least one child node and the at least one child node uses the withdrawn usable implementation entities. If the withdrawn usable implementation entities have at least one child node and the at least one child node uses the withdrawn usable implementation entities, step S560 is executed, or else the process is ended.

In step S560, the operation module 130 removes the withdrawn usable implementation entities from the set of candidate implementation entities, and adds the withdrawn usable implementation entities to a set of non-considered implementation entities.

In step S570, the operation module 130 adds the at least one child node that uses the withdrawn usable implementation entities to the set of withdrawn usable implementation entities.

In one embodiment, a selecting business logical method and a withdrawing business logical method can be applied according to the processes in FIGS. 4 and 5 and the database relevance tree 200 shown in FIG. 2.

In this embodiment, an initial business logical entity B6 can be defined as a product display function, and an initial implementation entity I6 can be defined as a list mode. An initial business logical entity B8 can be defined as a search function, and an initial implementation entity I8 can be defined as a search method. An initial business logical entity B7 can be defined as some condition, and an initial implementation entity I7 can be defined as a condition type search mode. An initial business logical entity B2 can be defined as a warning information function in a page, and an initial implementation entity I2 can be defined as a complete product display page. An initial business logical entity B3 can be defined as a login function on a page, and an initial implementation entity I3 can be defined as a login function implementation method. An initial business logical entity B1 can be defined as a product buying and selling function, and an initial implementation entity I1 can be defined as a shopping website. An initial business logical entity B9 can be defined as a product deletion function, and an initial implementation entity I9 can be defined as a product deletion method. An initial business logical entity B10 can be defined as a product adding function, and an initial implementation entity I10 can be defined as a product adding function. An initial business logical entity B4 can be defined as a card swiping and paying function, and an initial implementation entity I4 can be defined as a check-out method. An initial business logical entity B5 can be defined as an on-line transfer function, and an initial implementation entity I5 can be defined as a product modification method.

Nevertheless, those of ordinary skill in the art may understand that the solution is not limited by the above-mentioned embodiments, and functions or methods of relevance enough for definition of the asset storage system 100 can all be applied to the present invention.

In this embodiment, the asset database is in an initial state of having no selected implementation entity or currently usable implementation entity. Initial implementation entities I1, I2 and I5 are non-considered implementation entities, and initial implementation entities I3, I4, I6, I7, I8, I9 and I10 are candidate implementation entities. Below is described in detail a method for the operation module 130 to sequentially select initial business logical entities B6, B8, B7, B3, B2, B9 and B10 into the asset database and withdraw the initial business logical entity B8.

As shown in FIG. 2, users select the initial business logical entities B6, add the initial business logical entities B6 to a set of selected implementation entities, remove the initial implementation entity I6 from a set of candidate implementation entities and add the initial implementation entity I6 to a set of currently usable implementation entities, and the initial implementation entity I6 is set as a new usable implementation entity.

Currently new usable implementation entities are checked, wherein when all child nodes of a parent node of any new usable implementation entity are in a set of currently usable implementation entities, and the process of selecting the initial business logical entity B6 is ended.

Users select an initial business logical entity B8, add the initial business logical entities B8 to a set of selected implementation entities, remove the initial implementation entity I8 from a set of candidate implementation entities and add the initial implementation entity I8 to a set of currently usable implementation entities, and the initial implementation entity I8 is set as a new usable implementation entity.

Currently new usable implementation entities are checked, wherein if all child nodes of a parent node of any new usable implementation entity are not in the set of currently usable implementation entities, the process of selecting the initial business logical entity B8 is ended.

Users select an initial business logical entity B7, add the initial business logical entities B7 to a set of selected implementation entities, remove the initial implementation entity I7 from a set of candidate implementation entities and add the initial implementation entity I7 to a set of currently usable implementation entities, and the initial implementation entity I7 is set as a new usable implementation entity.

When It is checked in the set of currently new usable implementation entities that a parent node of the initial implementation entity I7 is an initial implementation entity I2 and all child nodes of the initial implementation entity I2 are in the set of currently usable implementation entities, then the initial implementation entity I2 is removed from a set of non-considered implementation entities and added to a set of candidate implementation entities.

Users select an initial business logical entity B3, add the initial business logical entities B3 to a set of selected implementation entities, remove an initial implementation entity I3 from a set of candidate implementation entities and add the initial implementation entity I3 to a set of currently usable implementation entities, and the initial implementation entity I3 is set as a new usable implementation entity.

Currently new usable implementation entities are checked, wherein if all child nodes of a parent node of any new usable implementation entity are not in the set of currently usable implementation entities, the process of selecting the initial business logical entity B3 is ended.

Users select an initial business logical entity B2, add the initial business logical entities B2 to a set of selected implementation entities, remove an initial implementation entity I2 from a set of candidate implementation entities and add the initial implementation entity I2 to a set of currently usable implementation entities, and the initial implementation entity I2 is set as a new usable implementation entity.

Currently new usable implementation entities are checked, wherein if all child nodes of a parent node of any new usable implementation entity are not in a set of currently usable implementation entities, the process of selecting the initial business logical entity B2 is ended.

Users select an initial business logical entity B9, add the initial business logical entities B9 to a set of selected implementation entities, remove an initial implementation entity I9 from a set of candidate implementation entities and add the initial implementation entity I9 to a set of currently usable implementation entities, and the initial implementation entity I9 is set as a new usable implementation entity.

Currently new usable implementation entities are checked, wherein if all child nodes of a parent node of any new usable implementation entity are not in a set of currently usable implementation entities, the process of selecting the new initial business logical entity B9 is ended.

Users select an initial business logical entity B10, add the initial business logical entities B10 to a set of selected implementation entities, remove an initial implementation entity I10 from a set of candidate implementation entities and add the initial implementation entity I10 to a set of currently usable implementation entities, and the initial implementation entity I10 is set as a new usable implementation entity.

It is checked in currently new usable implementation entities that a parent node of the initial implementation entity I10 is an initial implementation entity I5 and all child nodes of the initial implementation entity I5 are in currently usable implementation entities, and thus the initial implementation entity I5 is removed from a set of non-considered implementation entities and added to a set of candidate implementation entities.

It is checked that initial business logical entities B9 and B10 required by the initial implementation entity I5 are already complete, and thus the initial implementation entity I5 is removed from the set of candidate implementation entities and added to the set of currently usable implementation entities. The initial implementation entity I5 is set as a new usable implementation entity.

Currently new usable implementation entities are checked, wherein if all child nodes of a parent node of any new usable implementation entity are not in the set of currently usable implementation entities, the process of selecting a new initial business logical entity B10 is ended.

Next, users withdraw an initial business logical entity B8 and remove the initial business logical entity B8 from a set of selected implementation entities.

During the checking of a node of the uppermost layer in currently usable implementation entities, it is found that the initial implementation entity I2 needs the initial business logical entity B8, and the initial implementation entity I2 is set as a withdrawn usable implementation entity.

The initial implementation entity I2 (the withdrawn usable implementation entity) is removed from the set of currently usable implementation entities and added to the candidate implementation entities.

Each withdrawn usable implementation entity is checked and it is found that child node initial implementation entities I7 and I8 of the initial implementation entity I2 are in need of the initial business logical entity B8, and the initial implementation entity I2 (the withdrawn usable implementation entity) is removed from the set of candidate implementation entities. The initial implementation entity I2 is added to the set of non-considered implementation entities, and the initial implementation entities I7 and I8 are added to the set of withdrawn usable implementation entities as well.

In this embodiment, since the child node initial implementation entities I7 and I8 of the initial implementation entity I2 are in need of the initial business logical entity B8, after the initial implementation entity I2 is regarded as the withdrawn usable implementation entity, the initial implementation entities I7 and I8 are also removed from the set of currently usable implementation entities and added to the set of candidate implementation entities.

Child nodes of all nodes in the withdrawn usable implementation entities are checked and it is determined that no child node is in need of the initial business logical entity B8, and the process of withdrawing the initial business logical entity B18 is ended.

As can be known from the above, when users withdraw an initial business logical entity, asset entities related with the initial business logical entity are also automatically adjusted, and it is avoided that users mistakenly use other functions related with the withdrawn initial business logical entity. For example, when the initial business logical entity B8 (such as a search function) is withdrawn, the initial implementation entity I2 (such as a method of implementing a complete page) is regarded as a withdrawn usable implementation entity, and the initial implementation entity I7 (such as a condition type search mode) and the initial implementation entity I8 (such as an ordinary search mode) are removed from the set of currently usable implementation entities. The asset entities are no longer displayed on a user interface.

On the other hand, when users select an initial business logical entity, asset entities related with the initial business logical entity are also automatically adjusted, so that users can find other asset entities having relevance to the initial business logical entity during the searching.

Hereby, according to the disclosure, the relevance between each business logical entity and each implementation entity is stored as well while asset data is stored, so that the relations between elements can be found easily when the elements are searched, and the state of each of other asset entities related with the selected or withdrawn business logical entity can be adjusted dynamically. When some business logical entity is searched, all asset entities related with the business logical entity can be displayed together, and thus asset data can be stored and used more efficiently through the present invention.

Although the disclosure is disclosed with reference to the above embodiments, these embodiments are not intended to limit the disclosure. Various alternations and modifications can be made by those of skills in the art without departing from the spirit and scope of the disclosure, and thus the protective scope of the disclosure shall be defined by the appended claims.

What is claimed is:
1. An asset storage system, comprising:
   a storage device for storing an asset database which comprises a plurality of initial business logical entities and a plurality of initial implementation entities, wherein each initial business logical entity and at least one of the initial implementation entities are related to each other; and a central processing unit, configured for:
receiving a to-be-searched business logical entity;
searching in the storage device the initial implementation entities corresponding to the to-be-searched business logical entity;
establishing relevance between the initial business logical entities and the initial implementation entities and automatically establishing a database relevance tree according to the relevance, wherein the database relevance tree comprises at least one child node and at least one parent node, and each node of the database relevance tree records one of the initial business logical entities and the corresponding initial implementation entities thereof; and
receiving a withdrawing business logical signal or a selecting business logical signal, and after receiving the withdrawing business logical signal or the selecting business logical signal, automatically updating the database relevance tree according to the withdrawing business logical signal or the selecting business logical signal.

2. The asset storage system of claim 1, wherein the asset database is a multilayer database which comprises an upper layer database structure and a lower layer database structure, wherein the upper layer database structure comprises the initial business logical entities, and the lower layer database structure comprises the initial implementation entities.

3. The asset storage system of claim 1, wherein the central processing unit is further configured for:
after receiving the selecting business logical signal, adding an initial business logical entity corresponding to the selecting business logical signal to a set of selected implementation entities, and determining whether a set of candidate implementation entities has at least one initial implementation entity corresponding to the selecting business logical signal;
when determining that the set of candidate implementation entities has at least one initial implementation entity corresponding to the selecting business logical signal, setting the at least one initial implementation entity corresponding to the selecting business logical signal as at least one new usable implementation entity, and adding the at least one new usable implementation entity to a currently usable implementation entity; and
removing the at least one initial implementation entity corresponding to the selecting business logical signal from the set of candidate implementation entities.

4. The asset storage system of claim 3, wherein the central processing unit is further configured for:
determining whether all child nodes of respective at least one parent node of the at least one new usable implementation entity belong to the set of currently usable implementation entities;
when determining that all the child nodes of the respective at least one parent node of the at least one new usable implementation entity belong to the set of currently usable implementation entities, adding the at least one parent node to the set of candidate implementation entities, and removing the at least one parent node from a set of non-considered implementation entities;
determining whether the respective at least one parent node of the at least one new usable implementation entity is added to the set of currently usable implementation entities;
when determining that the respective at least one parent node of the at least one new usable implementation entity is added to the set of currently usable implementation entities, adding the at least one parent node to the set of currently usable implementation entities and set as one of at least one new implementation entity; and
removing the at least one parent node from the set of candidate implementation entities.

5. The asset storage system of claim 1, wherein the central processing unit is further configured for:
after receiving the withdrawing business logical signal, searching an initial business logical entity corresponding to the withdrawing business logical signal, and removing the initial business logical entity corresponding to the withdrawing business logical signal from a set of selected implementation entities the initial business logical entity corresponding to the withdrawing business logical signal;
searching at least one currently usable implementation entity of initial business logical entities that use the withdrawing business logical signal, and setting a currently usable implementation entity of a relatively uppermost layer in the database relevance tree as a withdrawn usable implementation entity; and
removing the withdrawn usable implementation entity from a set of the at least one currently usable implementation entity and adding the withdrawn usable implementation entity to a set of candidate implementation entities.

6. The asset storage system of claim 5, wherein the central processing unit is further configured for:
determining whether the withdrawn usable implementation entity has at least one child node and the at least one child node uses the withdrawn usable implementation entity;
when determining that the withdrawn usable implementation entity has the at least one child node and the at least one child node uses the withdrawn usable implementation entity, removing the withdrawn usable implementation entity from the set of candidate implementation entities, and adding the withdrawn usable implementation entity to a set of non-considered implementation entities; and
adding the at least one child node that uses the withdrawn usable implementation entity to the set of withdrawn usable implementation entities.

7. An asset storage method for a computer system, wherein the asset storage method comprises:
storing, by the computer system, an asset database which comprises a plurality of initial business logical entities and a plurality of initial implementation entities, wherein each of the initial business logical entity and at least one of the initial implementation entities are related to each other;
receiving, by the computer system, a to-be-searched business logical entity;
searching, by the computer system, the initial implementation entities corresponded to the to-be-searched business logical entity;
establishing, by the computer system, the relevance between the initial business logical entities and the initial implementation entities, and automatically establishing a database relevance tree according to the relevance, wherein the database relevance tree comprises at least one child node and at least one parent node, and each node of the database relevance tree records one of the initial business logical entities and the corresponding initial implementation entities thereof;
receiving, by the computer system, a withdrawing business logical signal or a selecting business logical signal; and after receiving the withdrawing business logical signal or the selecting business logical signal, automatically updating, by the computer system, the database relevance tree according to the withdrawing business logical signal or the selecting business logical signal.

8. The asset storage method of claim 7, wherein the asset database is a multilayer database which comprises an upper layer database structure and a lower layer database structure, wherein the upper layer database structure comprises the initial business logical entities, and the lower layer database structure comprises the initial implementation entities.

9. The asset storage method of claim 8, further comprising:
after receiving the selecting business logical signal, adding an initial business logical entity corresponding to the selecting business logical signal to a set of selected implementation entities, and determining whether a set of candidate implementation entities has at least one initial implementation entity corresponding to the selecting business logical signal;
when determining that the set of candidate implementation entities has the at least one initial implementation entity corresponding to the selecting business logical signal, setting the at least one initial implementation entity corresponding to the selecting business logical signal as at least one new usable implementation entity, and adding the at least one new usable implementation entity to a set of currently usable implementation entities; and
removing the at least one initial implementation entity corresponding to the selecting business logical signal from the set of candidate implementation entities.

10. The asset storage method of claim 9, further comprising:
determining whether all child nodes of respective at least one parent node of the at least one new usable implementation entity belong to the set of currently usable implementation entities;
when determining that all the child nodes of the respective at least one parent node of the at least one new usable implementation entity belong to the set of currently usable implementation entities, adding the at least one parent node to the set of candidate implementation entities, and removing the at least one parent node from a set of non-considered implementation entities; next,
determining whether the respective at least one parent node of the at least one new usable implementation entity is added to the set of currently usable implementation entities;
when determining that the respective at least one parent node of the at least one new usable implementation entity is added to the set of currently usable implementation entities, adding the at least one parent node to the set of currently usable implementation entities, and setting the at least one parent node as one of at least one new implementation entity; and
removing the at least one parent node from the set of candidate implementation entities.

11. The asset storage method of claim 7, further comprising:
after receiving the withdrawing business logical signal, searching an initial business logical entity corresponding to the withdrawing business logical signal, and removing the initial business logical entity corresponding to the withdrawing business logical signal from a set of selected implementation entities; next,
searching at least one currently usable implementation entity of initial business logical entities that use the withdrawing business logical signal, and setting a currently usable implementation entity of a relatively uppermost layer in the database relevance tree as a withdrawn usable implementation entity; and
removing the withdrawn usable implementation entity from a set of the at least one currently usable implementation entity, and adding the withdrawn usable implementation entity to a set of candidate implementation entities.

12. The asset storage method of claim 11, further comprising:
determining whether the withdrawn usable implementation entity has the at least one child node and the at least one child node uses the withdrawn usable implementation entity;
when determining that the withdrawn usable implementation entity has the at least one child node and the at least one child node uses the withdrawn usable implementation entity, removing the withdrawn usable implementation entity from the set of candidate implementation entities, and adding the withdrawn usable implementation entity to a set of non-considered implementation entities; next,
adding the at least one child node that uses the withdrawn usable implementation entity to the set of withdrawn usable implementation entities.

13. A non-transitory non-volatile computer readable recording medium, wherein it stores a computer program and is used for executing an asset storage method applied to an asset storage system, wherein the asset storage method comprises:
storing an asset database which comprises a plurality of initial business logical entities and a plurality of initial implementation entities, wherein each of the initial business logical entities and at least one of the initial implementation entities are related to each other;
receiving a to-be-searched business logical entity;
searching the initial implementation entities corresponded to the to-be-searched business logical entity;
establishing the relevance between the initial business logical entities and the initial implementation entities and automatically establishing a database relevance tree according to the relevance; wherein,
the database relevance tree comprises at least one child node and at least one parent node, and each node of the database relevance tree records one of the initial business logical entities and the corresponding initial implementation entities thereof;
receiving a withdrawing business logical signal or a selecting business logical signal; and
after receiving the withdrawing business logical signal or the selecting business logical signal, automatically updating the database relevance tree according to the withdrawing business logical signal or the selecting business logical signal.

* * * * *